United States Patent [19]

Morrison

[11] Patent Number: 5,360,828

[45] Date of Patent: Nov. 1, 1994

[54] BIOFOAM II

[75] Inventor: Robert L. Morrison, Modesto, Calif.

[73] Assignee: Regents of the University of California, Oakland, Calif.

[21] Appl. No.: 215,159

[22] Filed: Mar. 21, 1994

Related U.S. Application Data

[63] Continuation-in-part of Ser. No. 43,300, Apr. 6, 1993.

[51] Int. Cl.$^5$ .............................. C08J 9/26; C08J 9/28
[52] U.S. Cl. ....................................... 521/64; 106/122; 106/124; 106/125; 106/126; 106/129; 106/133; 106/205; 106/207; 106/218; 521/61
[58] Field of Search ................... 521/64, 61; 106/122, 106/124, 125, 126, 129, 133, 205, 207, 218

[56] References Cited

U.S. PATENT DOCUMENTS

| | | | |
|---|---|---|---|
| 3,632,361 | 1/1972 | Battista et al. | 106/122 |
| 3,849,350 | 11/1974 | Matsko | 521/54 |
| 4,012,265 | 3/1977 | Rinde | 106/122 |
| 4,034,032 | 7/1977 | Hendricks | 106/122 |
| 4,325,737 | 4/1982 | Rinde | 106/122 |
| 4,789,401 | 12/1988 | Ebinger et al. | 106/122 |

FOREIGN PATENT DOCUMENTS

| | | | |
|---|---|---|---|
| 303259 | 2/1989 | European Pat. Off. | 106/122 |
| 1005569 | 9/1965 | Germany | 106/122 |
| 1811290 | 6/1970 | Germany | 106/122 |
| 2734503 | 2/1979 | Germany | 106/122 |

OTHER PUBLICATIONS

"The Light Stuff" by Andrew Chaikin, *Popular Science*, p. 72, Feb. 1993.

"The Versitile Biofoam Solid" by Robert L. Morrison, *The World & I*, p. 244, Nov., 1992.

"SEAgel the latest in lightweight insulators" by Gordon Yano, *Newsline*, published by UC-LLNL, Jun. 5, 1992.

The Woodworkers' Store Catalog 1992–1993, cover page, and page 1 with packing peanut material listed.

"Lighter-than-Air Material Derived from Kelp", *Inside R&D*, vol. 21, No. 35, p. 8, Aug. 26, 1992.

"Lightweight, Biodegradable SEAgel has rich Commerical Potential", *Industrial Bioprocessing Technology*, vol. 14, No. 10, p. 5, Oct. 1992.

*Primary Examiner*—Morton Foelak
*Attorney, Agent, or Firm*—Daryl S. Grzybicki; Henry P. Sartorio

[57] ABSTRACT

Biofoam is a rigid, microcellular organic foam made from organic materials derived from natural products and biological organisms. Starting materials include agar, agarose, gelatin, algin, alginates, gellan gum, and microcrystalline cellulose. The organic material is dissolved in a polar solvent, typically water, and the mixture is gelled. The water in the gel pores is replaced at least once with another solvent to reduce the pore size of the final biofoam. The solvent in the gel pores may be replaced several times. After the final replacement of solvent, the gel is frozen and freeze-dried to form a biofoam. Translucent biofoams are formed by selecting a final solvent that forms very small crystals. A variety of crystalline, fibrous, amorphous, or metallic additives may be incorporated into the foam structure to produce lightweight composite materials with enhanced strength and insulating properties.

16 Claims, 1 Drawing Sheet

BIOFOAM II

The United States Government has rights in this invention pursuant to Contract No. W-7405-ENG-48 between the United States Department of Energy and the University of California for the operation of Lawrence Livermore National Laboratory.

This application is a continuation-in-part of U.S. patent application Ser. No. 08/043,300 filed Apr. 6, 1993.

BACKGROUND OF THE INVENTION

1. Field of the Invention

The present invention relates to rigid, microcellular organic foams made from naturally occurring organic material. The foam is formed from an organic gel in which the solvent in the gel pores is exchanged with at least one other solvent to produce microscopic pores. The gel is rapidly frozen and then dried to form a microcellular biofoam.

2. Description of Related Art

A myriad of applications exist for strong, low-density, inexpensive materials to manufacture lightweight articles. Synthetic polymers and foams, such as polystyrene, polyurethane, and Styrofoam®, are commonly-used materials for these purposes. A soluble, lightweight material made from corn and wheat is also currently available. A continual demand exists for the development of ever lighter, stronger, cost-effective materials that are biodegradable and made from renewable resources.

The scientific research communities in government and academia have a need for ultralightweight microcellular foams exhibiting a variety of characteristics. Researchers working with materials such as TPX (synthetic methylpentene polymer) and polystyrene have been unable to reach very low densities and create the cell structures desired. The present invention addresses these diverse needs and is a biofoam produced from organic materials derived from biological organisms, such as algae.

Biofoam is distinguishable from another class of ultralow density materials, namely aerogels, which were developed by another group at Lawrence Livermore National Laboratory. Aerogel is a true gel in which the gel structure must be maintained throughout the production process. In contrast, while the biofoam production process involves a gel stage, the end product is not a gel, but an open-cell rigid foam material similar to polystyrene. The different microscopic structures of the two materials leads to variances in their physical and chemical properties.

For example, the most common aerogel is a silica-based material that will not burn easily. Biofoam is an organic-based material that will burn without producing toxic fumes. The average cell or pore size of aerogel is about 10 times smaller than the pores in the present version of biofoam; aerogel pore diameters are about 0.02–0.03 microns, whereas biofoam cells have diameters of about 0.2–0.3 microns. The smaller pore size of aerogels makes them visibly transparent and better thermal and acoustic insulators than biofoam, although the present form of biofoam is almost transparent and has excellent insulating properties due to its small pore size.

The major advantage of biofoam over aerogel is its lower production cost. Aerogel's complex production process involving supercritical extraction of solvents is time-consuming and expensive when compared to the freeze-drying procedure used in biofoam production. Furthermore, biofoam is a more robust material than aerogel that can withstand greater forces without fracturing or deforming and can be readily machined into different shapes.

A biofoam with an average pore size less than that of the earlier version of biofoam (described in U.S. patent application Ser. No. 08/043,300) would have better insulating properties, making it more competitive with aerogel. The ultrasmall pore size would also result in translucent varieties of biofoam which are useful for certain applications. Therefore, the need exists for an improved version of biofoam having significantly smaller pores.

SUMMARY OF THE INVENTION

The present invention is a biofoam material and a method for making biofoam. The biofoam material is produced by dissolving a naturally occurring organic material, such as agar, gelatin, or an alginate, in a polar solvent, which is typically water. The amount of natural organic material in the mixture determines the density of the final foam. The mixture forms a gel, and the solvent in the gel pores is exchanged at least once with another solvent, which will form smaller pores in the gel when frozen. The exchanged gel is frozen and dried to produce the final biofoam. Numerous variations in the starting materials and the solvent exchange process are possible.

The biofoam material is biodegradable, mechanically strong, thermally insulative, with microscopic pores on the order of 0.2–0.3 microns. The foams typically have a density between 1 mg/cm$^3$ and 600 mg/cm$^3$. As the density increases, the foam becomes stronger and can support hundreds or thousands of times its own weight.

Biofoam may be used to replace the ubiquitous urethane foam packing peanuts, since these plastic forms are produced using environmental pollutants such as CFCs. The present version of biofoam has extremely small pores and thus very low thermal conductivity, making the material a good candidate for thermal insulation. One of the least expensive ways to produce biofoam is in thin, flat sheets, which is ideal for insulation in refrigerators, walls, windows, and transportation vehicles. Biofoam also makes a good sound-deadening material and vibration dampener by propagating sound waves very slowly; biofoam can be used simultaneously as acoustic and thermal insulation.

The simplest molecular formula for an agar biofoam is $CH_2O$, which is also the repeating unit in cellulose and wood. Consequently, when biofoam burns, the combustion products are carbon dioxide and water. Like wood, biofoam will produce carbon monoxide if burned in an oxygen-poor atmosphere, but will produce none of the more toxic fumes emitted when burning common plastic or synthetic foams. Biofoam is completely biodegradable and can degrade even faster than wood. This new material is a less expensive, low-density substitute for balsa wood, and can be used in the construction of model airplanes, as insulation in supertankers, or to provide sound insulation in high-speed rail cars and boats. The naturally renewable source of the starting materials and the absence of CFCs in the production process enhance the material's environmentally friendly qualities.

A variety of composite biofoam materials can be made that are lightweight but extremely strong. Metals, metal-containing compounds, carbon powder, fiberglass, and other fibrous additives can be incorporated into the biofoam structure to improve the material's strength, insulating properties, and aethestic qualities. More specialized pharmaceutical, agricultural, and space applications of biofoam are possible: ingestible foam pellets containing doses of time-release medications, biodegradable biofoam capsules embedded with seeds and containing ingredients like fertilizer, pH buffer, or herbicide, and foam capture medium for micrometeorites or interplanetary dust particles.

DETAILED DESCRIPTION OF THE INVENTION

Figure 1:
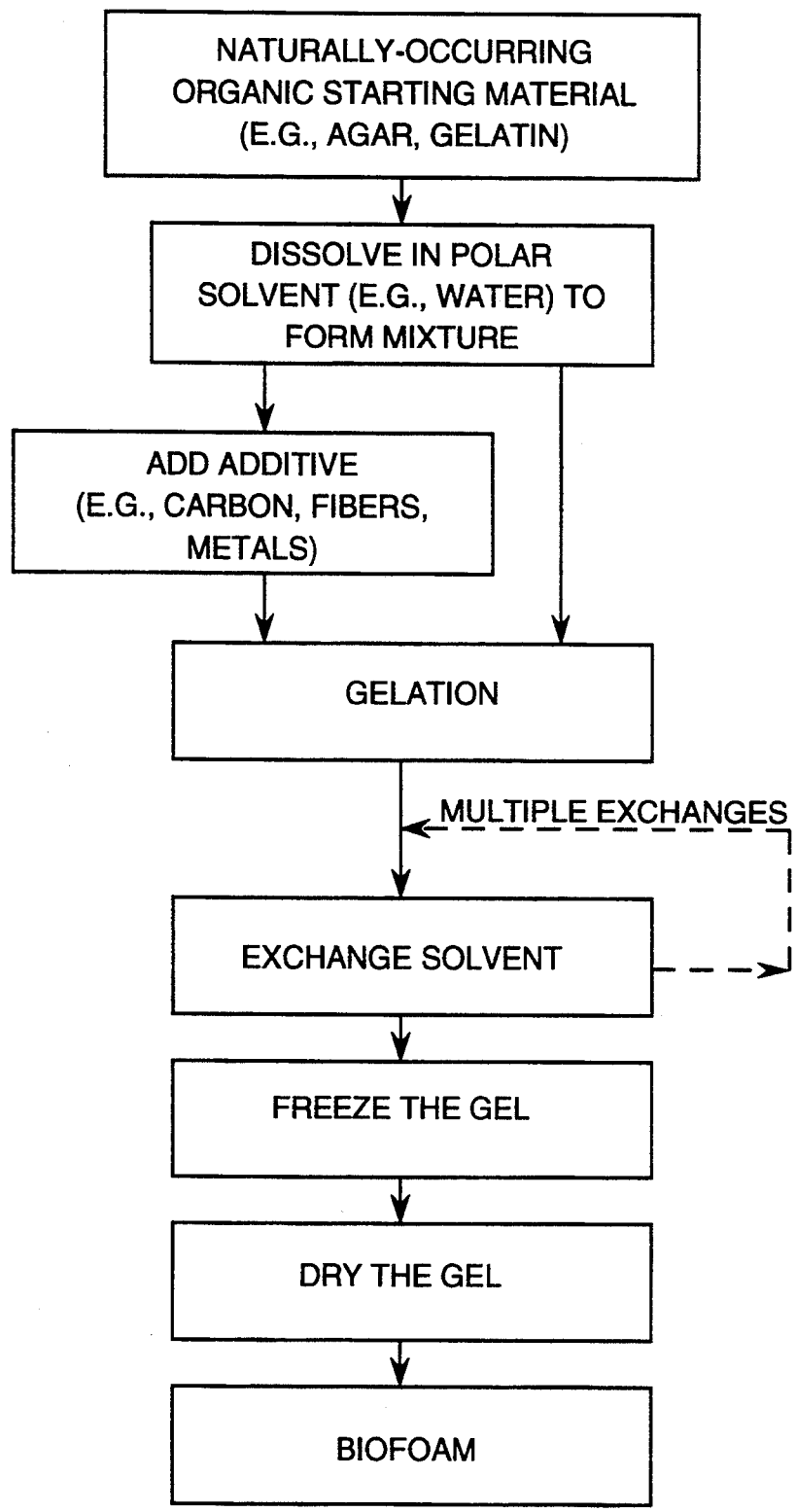
FIG. 1 is a flowchart of the method for making the present biofoam.

The invention is a rigid, microcellular organic foam and a process for making the foam. The biofoam is created from naturally occurring organic material of plants and animals. The material has extremely small pores (<1.0 micron, typically around 0.2–0.3 microns); the density typically ranges from about 1 mg/cm$^3$ to 600 mg/cm$^3$, and more commonly from 5 mg/cm$^3$ to 400 mg/cm$^3$.

The microcellular organic foam is made from materials derived from natural products or previously living organic tissues. The starting materials are naturally occurring polymers or biopolymers (of biological origin) and not synthetic polymers or plastics. The three main examples of natural polymers are polysaccharides, proteins, and nucleic acids. Polysaccharides are macromolecules that make up a large part of the bulk of the vegetable kingdom. Cellulose and starch are the most abundant organic compounds in plants. The repeat unit in polymer chains of cellulose and starch is D-glucose. Proteins, the second group of natural polymers, are polyamides in which $\alpha$-amino acids make up the repeat units. Collagen is the protein of connective tissues and skin. When boiled in water, the collagen dissolves and forms gelatin. Keratin is the protein of hair and wool. Nucleic acids make up the final group of natural polymers, which include RNA and DNA and are polymers of substituted polyesters.

The biofoam material is usually made from polysaccharides and high molecular weight proteins (e.g., gelatin). Polysaccharides include gums, gum resins, resins, agar (red algae), agarose, algin (brown algae or kelp), alginates, or cellulose. Gums are complex carbohydrates derived from plants and swell to produce a viscous dispersion or solution when added to water. One specific example is gellan gum, which is used alone, preferably, to form a very low density biofoam, but which can also be used in combination with gelatin and agar.

More than one material may be combined to reduce costs but retain the unique properties of the biofoam. Typically, the starting organic material is a 50-50 mixture (by weight) of agar and another material, like gelatin or alginate. The cost of the final foam may be lowered by using a minimum of agar (or another more expensive material) with a less expensive material such as gelatin. The cost of the biofoam then becomes competitive with balsa wood and conventional insulating materials.

FIG. 1 is a flowchart illustrating the present method for making biofoam material. A natural organic material is initially dissolved in at least one polar solvent, preferably water. Water will dissolve large amounts of many of the natural organic materials, which is necessary to produce higher density foams. Alcohol may also be used as the primary solvent, but will only dissolve smaller amounts of organic material to produce lower density biofoams. The solvents can also be mixed in various proportions.

The natural organic material, such as agar, is the pore- or cell-forming material in the biofoam. The density (and cell wall thickness) of the final biofoam is determined by the amount of dilution of the starting material. Higher dilution produces lighter foams; that is, a smaller number of organic molecules dispersed in the mixture will produce thinner cell walls and thus less dense foams.

The bio-organic material forms a mixture in water, and the organic mixture is gelled. The mixture is cast in a container of any shape or size to gel. The container can be placed in an ice water bath to hasten gelation, although the gel can form at ambient temperatures. Care must be taken not to freeze the gel at the gelation step. The gelation time depends on the amount of dilution of the mixture, as well as the temperature. Highly dilute mixtures will take more time, but typically gelation will occur in minutes.

To produce biofoam with a small (<0.5 $\mu$m) pore size, the solvent in the gel pores is replaced at least once with another solvent that forms smaller crystals when frozen. Water, in contrast, has high heat capacity and tends to produce large crystals when frozen in the gel pores, leading to large pores and an opaque biofoam. For this reason, the solvent is typically exchanged multiple times to eliminate the water from the gel, thus allowing for very rapid freezing and minimizing the pore size. Solvents having lower and lower heat capacity are typically exchanged in sequence.

The second solvent is organic and water-soluble, such as an alcohol, a ketone (e.g., methylethylketone), an ether, an aidehyde, or an amine (e.g., acetonitrile). If, as an example, an alcohol is used as the second solvent, the gel is typically placed in several baths of successively higher alcohol concentration to progressively replace the water in the gel with alcohol. When frozen, the alcohol creates smaller pores in the gel than water. If an even smaller pore size is desired, then the solvent in the gel pores is replaced with a third solvent. (If the primary solvent is an alcohol, then the next replacement step actually uses a "second" solvent.)

The third solvent is typically a nonpolar organic solvent, and the choice of solvent is only limited by the desired pore size and the practical considerations of cooling the solvent below its freezing point. Additionally, the third solvent is soluble in the prior (second) solvent. The primary and third solvents are typically immiscible, and therefore the second solvent acts as a co-solvent, soluble in both.

The preferred nonpolar solvent is a solution of p-xylene (1,4-dimethylbenzene) and cyclohexane, but other nonpolar solvents are effective: hexadecane, naphthalene, and freons. Unlike the biofoam described in copending U.S. patent application Ser. No. 08/043,300, in which the freezing point of the final organic solvent and water mixture is only slightly below 0° C. to prevent a prolonged freeze-drying process, a greater number of solvents are effective in the present method. Solvents with very low melting points may be used as the final solvent, or solvents with high melting points such as naphthalene (m.p. 80° C.).

In the same manner as the replacement of the primary solvent, the gel is placed in baths of the third solvent to remove all of the second solvent from the pores and exchange the third solvent for the second. This replacement is made easier due to the solubility of the second and third solvents. The solvent in the gel can be replaced many times, with each successive solvent producing smaller pores when frozen. In this way, the pore size is reduced to a few tenths of a micron and the resultant biofoam may be translucent.

After the final replacement of solvent in the gel, the gel is typically supercooled (below the freezing point of the solvent). The solvent in the gel is then rapidly frozen in the pores, such as in a cold ethanol bath. The mold can be completely submerged, isometrically freezing the molecules of solvent in the cells or pores of the gel.

After the solvent is frozen within the cells of the gel, the solid solvent is removed by sublimation during freeze-drying to form the final biofoam. The frozen gel is placed in freeze-drying units, which are kept at a temperature comfortably below the freezing point of the solvent. The frozen gels are typically vacuum dried over a few hours to a few days, depending on the thickness of the material. As the solvent sublimes, the gases are collected on cold traps outside the freeze-dry units. If the solvent is allowed to become liquid, the foam structure shrinks and collapses. The freeze-drying step can be omitted if the density of the final material is greater than about 450 mg/cm$^3$. In these higher density foams, the solvent can be removed simply by evaporation at atmospheric pressure.

The final biofoam is a highly permeable, open-cell structure, with a density typically ranging from less than air (1.2 mg/cm$^3$) to about 600 mg/cm$^3$. The pore or cell sizes usually are less than 1.0 μm diameter, and more typically are clustered around 0.2–0.3 μm, although the cell size distribution is broad. The foams can be translucent, with low thermal and acoustic conductivity, and have the mechanical strength to support hundreds of times their own weight. The biofoam is biodegradable, soluble in hot water, and non-toxic, depending on additives used.

As shown in FIG. 1, additives may be added to the organic mixture before the gelation step to make composite biofoam materials that are stronger than the "pure" organic forms, or have enhanced (more desirable) physical or aesthetic properties. Almost any element or compound may be used as an additive, such as fibers, metals, metal-containing compounds, and carbon powder. The amount and type of additive is determined by the desired characteristics of the final biofoam. The mass or volume of an additive may be greater than the starting organic material; the limiting factors on the amount of additive include the solubility of the additive in the mixture and the mixture's viscosity. If the addition of additives creates an inhomogeneous or highly viscous mixture, then gelation and further processing cannot proceed.

Any metal may be added to the mixture to satisfy a given application; aluminum powder is one example. Other examples of additives include titanium metal in the form of alkali tetratitanate, microcrystalline cellulose, sawdust, fibrous graphite, fiberglass, amorphous carbon powder, and fibers of Kevlar ® (amadine), cotton, or polyester. Alkali tetratitanate has proven very effective in increasing the density and strength of the final biofoam; microcrystalline cellulose or sawdust can also be used as additives. Any fibrous material that is not soluble in the original organic mixture is a potential additive. However, if a translucent biofoam with very small pore size is desired, then the fibers should not be longer than the diameter of the pores or cells in the final material.

EXAMPLE

One embodiment of the biofoam is made from agar, a polysaccharide material that is derived from certain red algae, particularly the seaweed Rhodophyceae. Rhodophyceae is a class of red algae (belonging to the subphylum Rhodophyta) with several agar-producing genera, which grow in the Pacific and Indian Oceans and the Japan Sea. Agar is commonly used as a nutrient medium for bacterial cultures, as a laxative, and as a food thickener. The simplest molecular formula for-the agar foam is approximately $CH_2O$.

The biofoam is commonly made using agar or a mixture of agar and gelatin as the starting organic material. Two grams (2.0 grams) of agar and two grams (2.0 grams) of gelatin are dissolved in 100 milliliters of hot water. This mixture is poured into a mold to gel. The gel is placed in a bath of 95% ethanol (190 proof), and the ethanol replaces the water in the gel pores. The gel is placed in a bath of pure ethanol (200 proof), which replaces any remaining water. When the water has been completely replaced, the alcohol gel is placed in a bath containing a 50–50 solution (by volume) of p-xylene and cyclohexane to replace the alcohol. The gel is repeatedly (3X) immersed in p-xylene/cyclohexane baths to remove all traces of ethanol.

The gel is supercooled to below the freezing point of the p-xylene/cyclohexane solution (<13° C.) and then frozen very rapidly in isopentane at −150° C. The frozen gel is then freeze-dried at about 0° C., leaving intact the cellular structure of the frozen gel. When freeze-drying is complete, the cast material is removed from the mold. The resulting cell structure of this biofoam has an average cell diameter of about 2500 Å, making the biofoam almost transparent. The final material is machinable. The density of the biofoam made in this example is approximately 200 mg/cm$^3$, and the surface area is about 200 m$^2$/g.

The foregoing description of preferred embodiments of the invention is presented for purposes of illustration and description and is not intended to be exhaustive or to limit the invention to the precise form disclosed. Many modifications and variations are possible in light of the above teaching.

We claim:

1. A method for forming a rigid, microcellular biofoam, comprising:
   (a) dissolving a naturally occurring organic material in a primary solvent to form a mixture;
   (b) forming a gel from the mixture, where the pores in the gel are occupied by the primary solvent;
   (c) replacing the primary solvent with a second solvent;
   (d) freezing the gel; and
   (e) drying the gel to form an organic biofoam.

2. A method for forming a biofoam as recited in claim 1, wherein the naturally occurring organic material comprises at least one of agars, agarose, algins, alginates, gums, resins, gum resins, and gelatins.

3. A method for forming a biofoam as recited in claim 1, wherein the primary solvent comprises a polar solvent.

4. A method for forming a biofoam as recited in claim 1, wherein the primary solvent is selected from the group consisting of ketones, ethers, alcohols, aldehydes, amines, water, and mixtures thereof.

5. A method for forming a biofoam as recited in claim 1, wherein the primary solvent comprises water and the second solvent is selected from the group consisting of ketones, ethers, alcohols, aldehydes, amines, and mixtures thereof.

6. A method for forming a biofoam as recited in claim 1, further comprising the step of replacing the second solvent with a third solvent before freezing the gel.

7. A method for forming a biofoam as recited in claim 6, wherein the second solvent is soluble in the first and third solvents.

8. A method for forming a biofoam as recited in claim 6, wherein the third solvent comprises a nonpolar solvent.

9. A method for forming a biofoam as recited in claim 6, wherein the third solvent is selected from the group consisting of nonpolar hydrocarbons and nonpolar aromatics.

10. A method for forming a biofoam as recited in claim 9, wherein the third solvent is selected from the group consisting of 1,4-dimethylbenzene, cyclohexane, hexadecane, naphthalene, freons, and mixtures thereof.

11. A method for forming a biofoam as recited in claim 10, wherein the primary solvent comprises water, the second solvent comprises an alcohol, and the third solvent comprises 1,4-dimethylbenzene and cyclohexane.

12. A method for forming a biofoam as recited in claim 1, wherein the drying step is carried out by freeze-drying.

13. A method for forming a biofoam as recited in claim 1, wherein the drying step is carried out by evaporation.

14. A method for forming a biofoam as recited in claim 1, further comprising the step of adding an additive to the mixture before forming the gel to produce a composite biofoam material.

15. A method for forming a biofoam as recited in claim 14, wherein the additive is selected from the group consisting of fibers, carbon powder, and metal powders.

16. A method for forming a biofoam as recited in claim 14, wherein the additive is selected from the group consisting of graphite fibers, microcrystalline cellulose, sawdust, amadine fibers, cotton fibers, polyester fibers, fiberglass, alkali tetratitanate, metal powders, and carbon powder.

* * * * *